United States Patent [19]
Potgiesser

[11] 3,793,640
[45] Feb. 19, 1974

[54] DEVICE FOR THE MAGNETIC DOMAIN "BUBBLE" STORAGE OF DATA

[75] Inventor: Jan Antoon Ludolf Potgiesser, Emmasingel, Netherlands

[73] Assignee: U.S. Philips Corporation, New York, N.Y.

[22] Filed: July 3, 1972

[21] Appl. No.: 268,819

[30] Foreign Application Priority Data
Apr. 13, 1972 Netherlands ....................... 7204924

[52] U.S. Cl. .. 346/74 M, 179/100.2 R, 340/174 TF
[51] Int. Cl. ...................... G11c 11/14, G01d 15/12
[58] Field of Search 340/174 R, 174 TF; 346/74 M, 346/74 R; 179/100.2 R

[56] References Cited
UNITED STATES PATENTS
3,503,054 3/1970 Bobeck .......................... 340/174 R OTHER PUBLICATIONS
IBM Technical Disclosure Bulletin, Vol. 15, No. 5, 10-72 p. 1,608 Bosch et al.

*Primary Examiner*—Daryl W. Cook
*Assistant Examiner*—Jay P. Lucas
*Attorney, Agent, or Firm*—Frank R. Trifari; Carl P. Steinhauser

[57] ABSTRACT

A device for the magnetic storage of information in which information is written on a magnetizable medium by means of the external field of a stable magnetic domain which is supported by a plate of a magnetic material having an easy axis of magnetization which is normal to the plane of the plate. For recording a number of juxtaposed tracks on the medium, the plate may comprise one stable magnetic domain per track to be recorded.

5 Claims, 10 Drawing Figures

DEVICE FOR THE MAGNETIC DOMAIN "BUBBLE" STORAGE OF DATA

Figure 1:
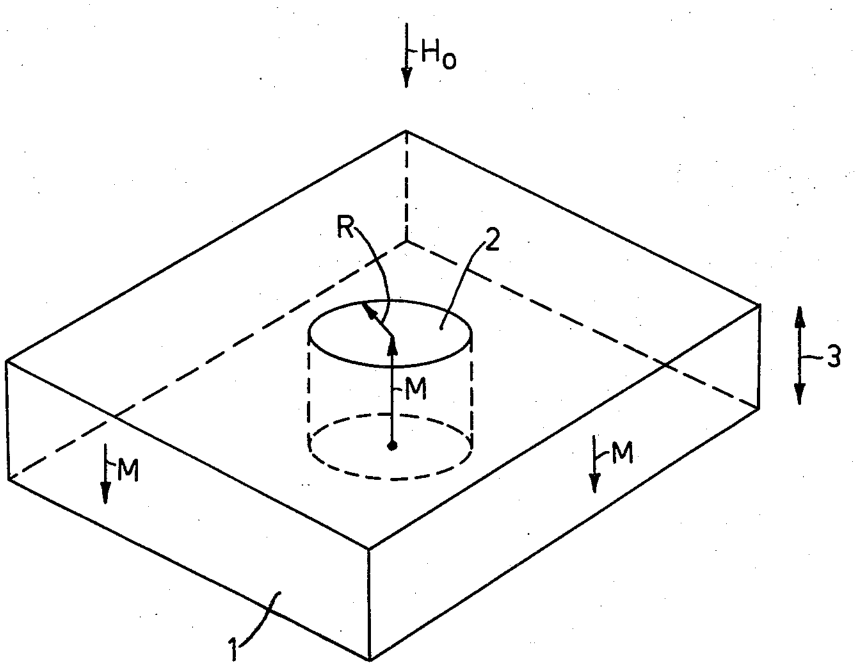

The invention relates to a device for the magnetic storage of data consisting of a remanent magnetizable recording medium provided on a carrier, for example, a tape, a disk or a drum, and a device cooperating therewith to cause a magnetic field to selectively influence the recording medium.

Magnetic storage of data, i.e., the use of remanent magnetizations provided locally in ferromagnetic material to store both digital and analogue information, is well known as well as the advantages involved: in principle a high packing density of the information, after storage the information is immediately available and the information can be erased, if necessary, it being even possible to selectively erase a restricted part of the stored information. It is to be noted that said advantages should actually be ascribed to the use of a magnetizable recording medium.

A limiting factor in the magnetic storage of data, however, is the conventional magnetic head which is used to cause a magnetic field to selectively influence the recording medium. As is known, a magnetic head consists in principle of an annular core of ferromagnetic material which is provided with a gap and on which an electric winding is provided. For storing information, the head cooperates, in contact or at a small distance, with a recording medium which is selectively magnetized by the magnetic field which emanates from the core at the area of the gap when an electric current supplied to the winding produces a magnetic flux through the core.

In particular, on the one hand the dimensions of the conventional magnetic head and on the other hand the inertia which is associated with the mechanical movement of a head prevents the optimum use of the high information packing density presented by magnetizable recording media.

The invention provides a quite new type of magnetic head which permits of better using the information packing density of the magnetizable recording medium.

For that purpose, a device for storing information according to the invention is characterized in that, for causing a magnetic field to selectively influence the recording medium, the device comprises a plate of magnetizable material which is destined to support cylindrical magnetic domains, as well as a device for producing a first magnetizing field having a field strength which is sufficient to maintain magnetic domains produced in the plate and having a direction which extends substantially normal to the plane of the plate, all this in such manner that the field of a cylindrical magnetic domain emanating from the plate can influence the recording medium.

Materials in which in particular single-wall cylindrical magnetic domains can be produced and moved are described in Bell System Technical Journal, volume 46, No. 8, October 1967, pp. 1,901 et. seq. Materials having this property are, for example, the rare earth orthoferrites. They have an easy axis of magnetisation which extends substantially normal to the plane of the plate. A magnetic domain as means above is observed in such a plate as a localized region in which the magnetisation is directed opposite to the direction of an external field along the easy axis, the direction of magnetisation of the surrounding regions of the plate corresponding to the direction of the external field.

The domain preferably assumes the shape of a circle (plan view) having a diameter which is determined by the parameters of the material of the plate and by the external "bias magnetisation" field. This bias magnetisation field which has a polarity which contracts the domains ensures that these can exist as stable units, so called "bubbles." Various methods are known to move such domains from one position in the plate to another. See, for example, the Dutch Pat. application Nos. 6,903,253, 6,905,706 and 6,916,956. Known applications are the movement of domains in a shift register operation, and a memory device in which a binary "zero" and a binary "one" in a memory place is represented by the presence of a domain in a first and a second position, respectively.

The invention is based on the recognition of the fact that the field of a magnetic domain emanating from the plate can be used for storage of information. According to the invention it presents several advantages if in devices for storing data the conventional magnetic head is replaced by a plate of a magnetisable material which comprises cylindrical magnetic domains of which the field emanating from the plate is used to selectively write a recording medium. It has actually proved possible to magnetise a recording medium in the manner described in the longitudinal direction under suitably chosen conditions as regards (first) magnetizing field, coercive force of the magnetizable medium and material parameters of the "bubble" plate.

An important advantage is that a cylindrical magnetic domain, dependent on the material parameters and on the bias magnetization field, can have a diameter of, for example, 20 microns. As will be described in greater detail hereinafter, this involves that information tracks to be written on a magnetizable medium via such a magnetic domain can have a considerably smaller track width than is realizable by means of conventional magnetic heads.

Another advantage is that a plate of "bubble" material can simply be designed to support a number of magnetic domains one beside the other, the external field of each of which being usable as a writing field. In this manner the complicated and hence expensive conventional multitrack head can be replaced by a "bubble" plate forming an "integrated head."

A further advantage related to the preceding one is that the mechanical movement of a head over a number of tracks, as is usual in disk memories, is no longer necessary when a "bubble" plate is used as a head and which comprises one magnetic domain per track. The time required to write a bit can be considerably reduced thereby.

By applying a second magnetizing field (the auxiliary field) which extends normal to the first magnetizing field (the bias field) the overall external field of a "bubble" can be increased on one side and be reduced on the other side. As will be described in greater detail, when the properties of the material of the "bubble" plate and of the recording medium are suitably chosen the field emanating from the plate together with the auxiliary field is high enough only at a part of the wall of the "bubble" to record information on the medium. Via a cylindrical magnetic domain having a diameter of 20 $\mu$m, for example, an information track can be written with a width of 10 $\mu$m.

The recording medium is preferably arranged so as to be movable relative to and parallel to the "bubble" plate — which should be capable of containing at least one cylindrical magnetic domain — so that information can be written throughout its length. For writing binary "zeros" and "ones" a circuit may be present for the purpose, for example, which can determine at least two stable positions in the plate for a given "bubble."

When return to a rest position is not necessary, two stable positions per "bubble" will do. However, the bubble-plate may also be designed without any problem so that 3 stable positions are present per bubble, of which one is the rest position. Of course, the required track width then increases by one-third.

An interesting application, however, is involved in the condition that upon varying the amplitude of the auxiliary field a part of the wall of the "bubble" varying in length cooperates in recording the information. This even permits of recording analogue information.

For that purpose, an embodiment of the device according to the invention is characterized in that the direction of the second magnetization field is parallel to the direction in which the recording medium is movable and that the amplitude of the second magnetizing field is variable in accordance with an information signal to be recorded.

In addition it is possible to vary the direction of the auxiliary field as a result of which each time another part of the wall of the "bubble" cooperates in recording the information. In this manner also it is possible to write analogue information but the variation of the direction of the auxiliary field is particularly suitable for recording binary information.

For that purpose, an alternative embodiment of the device according to the invention is characterized in that the direction of the second magnetizing field is normal to the direction in which the recording medium is movable and may comprise a first sense of direction or a second sense of direction opposite to the first one in accordance with a binary information signal to be recorded.

For the problem of magnetic data storage at high frequencies and/or high packing density, a solution is often sought in writing successive signal elements on the medium in a direction which makes an angle with the direction of movement of the medium (generally a tape), the so-called "scanning." This provides the advantage that the actual tape speed can be reduced, but it suffers from the drawback that either a plurality of magnetic heads must be used involving the complex switching circuits required for that purpose, or one single magnetic head which is to be moved mechanically in a direction at right angles to the tape.

The above-mentioned drawbacks are avoided when a "bubble" plate is used as a scanning magnetic head.

A further embodiment of the device for the storage of data according to the invention is for that purpose characterized in that driving means are present to move the magnetizable medium along the plate, which plate comprises a magnetic domain for the zone-wise scanning of the magnetizable medium, which domain can be moved, by means of a domain propagation device, along an axis which makes an angle (preferably of 90°) with the direction of movement of the magnetizable medium, a circuit being present for the synchronous variation, in accordance with the variations of an electric signal having analogue information, of either the position of the domain relative to the said axis, or the size of the domain, or the amplitude of the auxiliary field.

It is known, for example, that the size of a "bubble" domain increases when the bias field decreases, and decreases when the bias field increased and that the difference between the minimum and maximum dimension may be a factor 3.

In Journal of Applied Physics, volume 42, No. 4, pp. 1,270–1,272, March, 1971 it is described that it is possible, when certain conditions are satisfied, to produce annular, "hollow" magnetic domains.

On the one hand it is an advantage of hollow domains that in order to obtain the same variation in size as in the non-hollow domains, a variation of the bias field is necessary which is much smaller — for a variation in size by a factor 2, for example, 100 $x$ smaller — than that which is required therefor in non-hollow domains. So a hollow domain has a much larger signal sensitivity.

On the other hand it is an advantage that the size of a hollow domain can vary much more considerably than that of a non-hollow domain. A difference between minimum and maximum dimension of a factor 25 is possible. This means that larger signal variations can be established with the external field of a hollow magnetic domain than with the external field of a non-hollow magnetic domain.

A further embodiment of a device for the storage of data according to the invention is therefore characterized in that for the zone-wise scanning of the magnetizable medium the plate comprises a hollow magnetic domain.

Known is the use of a magnetic field produced by a current conductor to control the movement of a bubble. In that case permally dots may be arranged on the bubble platelet to provide stable positions.

It is also possible, however, to control the movement of bubbles by means of electromagnetic radiation. It has actually been found that in, for example, orthoferrite crystals selective radiation causes a local decrease of the magnetic permeability, which gives rise to the fixation of a magnetic domain in that place, whereas in, for example, iron borate crystals selective radiation produces a local increase of the magnetic permeability, which gives rise to the change in place of a magnetic domain. At a suitable chosen temperature, the magnetic permeability reassumes its original value immediately after termination of the radiation.

A further embodiment of the device according to the invention is characterized in that the magnetic material of the plate has the property that the magnetic permeability is variable by irradiation with electromagnetic radiation and that the domain propagation means comprise a source of electromagnetic radiation which can irradiate the plate in the desirable places.

Figure 2:
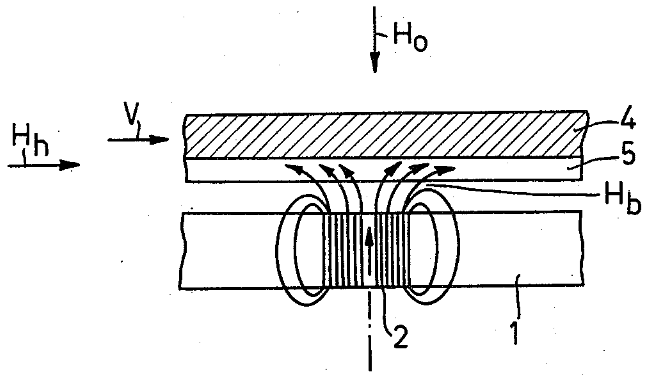
Figure 3:
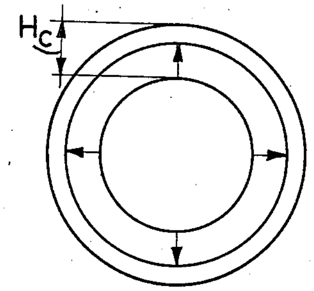
Figure 4:
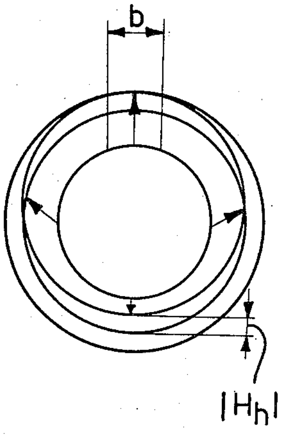
Figure 5:
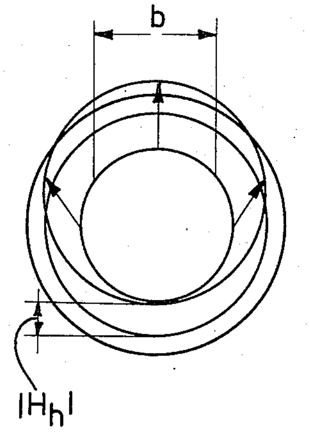
Figure 6:
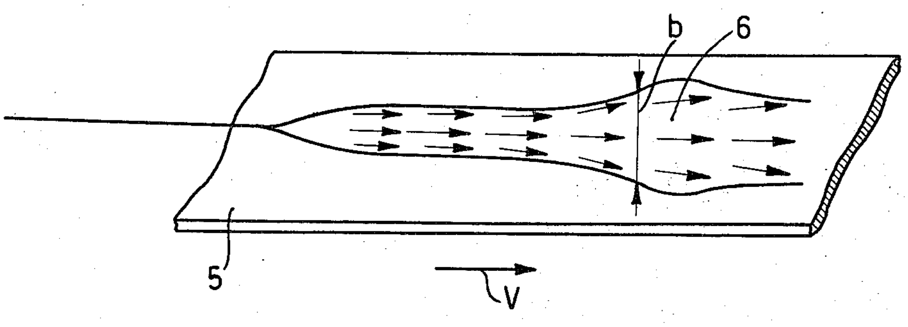
Figures 7, 8, 9, 10:
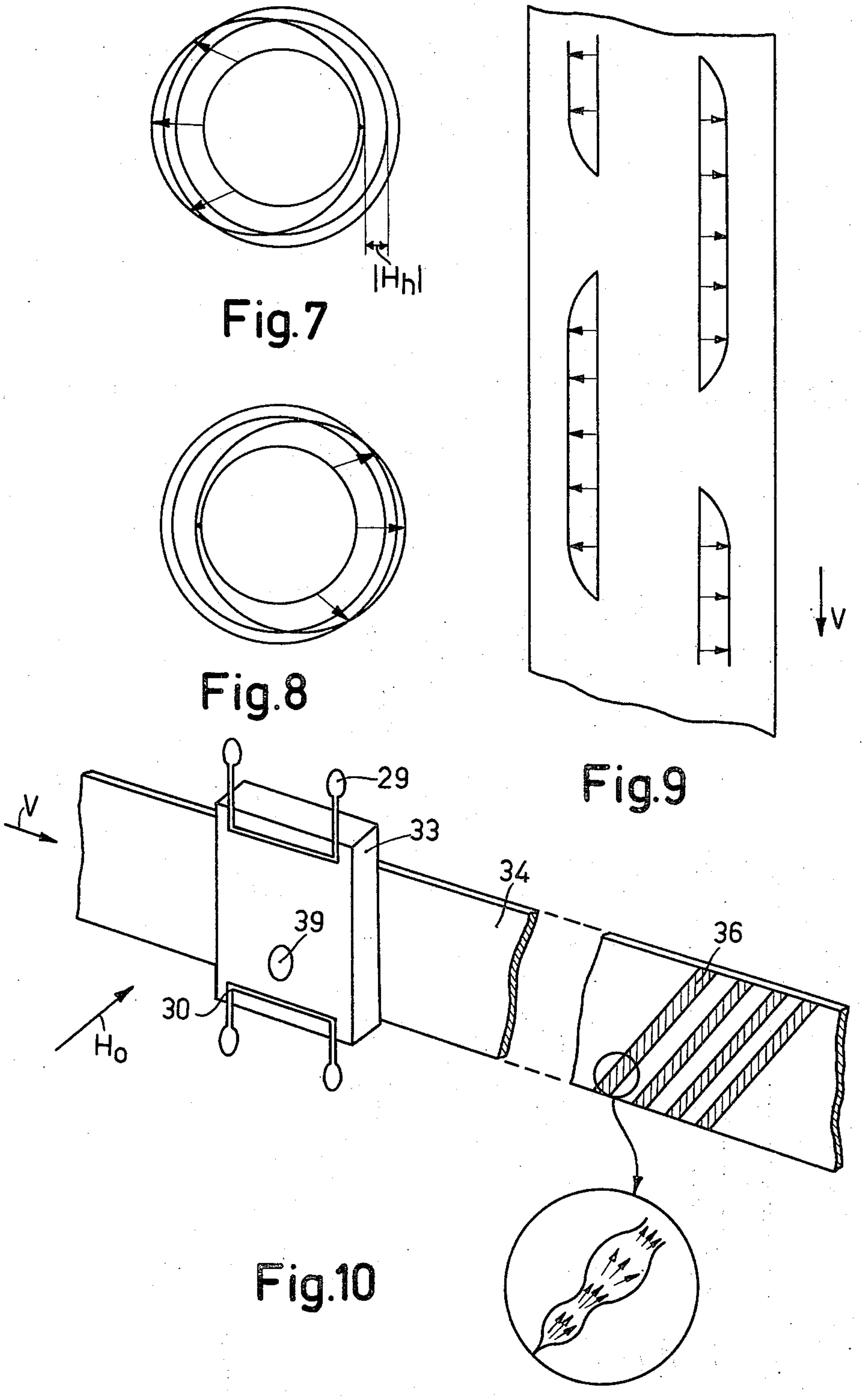

The invention will be described in greater detail, by way of example, with reference to the drawing, in which:

FIG. 1 shows a plate of a magnetizable material having a magnetic domain therein, FIG. 2 shows the influence of the external field of a magnetic domain on a magnetizable medium, FIG. 3 is a plan view of the influence of the external field of a "bubble" on a recording medium, FIGS. 4 and 5 are plan views of the collective influence of a "bubble" field and an auxiliary field, FIG. 6 shows a recording medium with an information track written therein by means of the arrangement shown in FIG. 2, FIGS. 7 and 8 show the collective influence of a "bubble" field and an auxiliary field upon recording binary information, FIG. 9 shows a recording medium with an information track written therein.

FIG. 10 shows a scanning device for the storage of information

FIG. 1 shows a plate 1 of a magnetizable material having a thickness 3 which is cut from a crystal in such a manner that the easy axis of magnetization extends substantially normal to the plane of the plate. The plate is in an external field $H_o$ which is oriented along the easy axis of magnetization. In known manner, a magnetic domain 2 having a radius R is produced in the plate 1. The direction of magnetization of this domain is opposite to the direction of magnetization of the surrounding region of the plate 1.

FIG. 2 is a cross-sectional view of the same plate as shown in FIG. 1 and this Figure shows how the external field $H_b$ (the external field of the magnetic bubble domain) of the magnetic domain 2 can magnetize in the longitudinal direction a magnetizable medium 5 which is provided on a carrier 4 and which is present at a very small distance from or in contact with the plate 1 which comprises the domain 2. In this case a number of conditions must be satisfied which will be illustrated with reference to the following example.

The following general conditions must be satisfied:

The bias magnetization field may not erase the information to be written on the magnetizable medium, so $H_o << 4\pi M_{med}$ ($H_o$ = field strength bias magnetization field, $4\pi M_{med}$ = saturation magnetization of the magnetizable medium).

The external field of the bubble must be capable of writing the magnetizable medium, so $H_B > H_{C_{med}}$ ($H_B$ = field strength of the external field of the bubble, $H_{C_{med}}$ = coercive force of the magnetizable medium).

The bubble must be stable, so $H_O = h\ 4\pi M_S$ ($H_O$ = field strength bias magnetization field, $4\pi M_S$ = saturation magnetization of the bubble material), with $0 < h < 1$.

In a "bubble" material having a characteristic material length $L = \sigma W / 4\pi M^2{}_S = 0.08\ \mu$ ($\sigma_w$ = wall energy per unit of surface, $M_S$ = saturation magnetization of the "bubble" material), a thickness $d = 10\ \mu$, and a saturation magnetization $M_S = 100$ Gauss, bubbles of radius $R = 1.5\ \mu$ can be produced with a bias magnetization field $H_O = 960$ *Oe*, and bubbles of radius $R = 0.55\ \mu$ with a bias magnetization field $H_O = 1{,}032$ Oe.

The external field of a bubble of radius $R = 1.5\ \mu$ available for longitudinal magnetization of a magnetizable medium which is present at a distance of 1 $\mu$ from the "bubble" plate then is approximately 360 *Oe* at the area of the "bubble" wall. This field of 360 *Oe* is strongly local so that the magnetizable medium which in this case must thus have a coercive force which is smaller than 360 *Oe* is written only at the area of the "bubble" wall. This means that an information track written by means of the external field of a bubble is very readily defined. When the magnetizable medium 5 is moved along the plate 1 in the direction of the arrow $v$ an information track 6 will be written in the magnetizable medium 5.

FIG. 3 shows a plan view of the "bubble" field. The size and the direction are denoted by arrows. The coercive field of the medium is also denoted. Without an auxiliary field, the "bubble" field is not capable of overcoming this coercive field. The case in which the strength of the auxiliary field is not zero will now be considered with reference to FIG. 2.

The following general conditions must be satisfied:

The bias magnetization field may not erase the information to be recorded on the magnetizable medium, so $H_o << 4\pi M_{med}$ ($H_o$ = field strength bias magnetization field, $4\pi M_{med}$ = saturation magnetization of the magnetizable medium).

Together with the auxiliary field the external field of the bubble must be capable of writing the magnetizable medium, so $H_h + H_B > H_{C\ medium}$ ($H_B$ = field strength of the external field of the bubble, $H_{C\ medium}$ = coercive force of the magnetizable medium). This involves that by means of a "bubble" plate substantially any magnetic layer can be written when an auxiliary field of a suitable value is used. While using the same assumptions as in the description with reference to FIG. 2 (strength "bubble" field is 360 *Oe*), this means that, for example, by means of an auxiliary field of 100 *Oe* a readily defined information track can be recorded on a magnetizable layer having a coercive force of, for example, 400 *Oe*. When the magnetizable medium 5 is moved along the plate 1, in the direction of the arrow $v$, an information track 6 as is shown diagrammatically in FIG. 6 will be written in the magnetizable medium 5. The small arrows denote the local magnetization.

The width of this track may be varied by varying the amplitude of the auxiliary field as is shown in FIGS. 4 and 5. The arrows denote the resultant of "bubble" field + auxiliary field. Only over a small part of the wall of the "bubble" (the part "$b$") is said resultant field large enough to overcome the coercive field of the medium. So information can be recorded only in that place. The auxiliary field shown in FIG. 5 is larger than that of FIG. 4 so that recording occurs over a larger part "$b$" of the "bubble" wall.

FIGS. 7 and 8 show the case in which the auxiliary field extends normal to the direction of movement $v$ of the recording medium. In FIG. 7 the direction of the auxiliary field is such that information is recorded only via the left-hand side of the "bubble." In FIG. 8 the auxiliary field is reversed (rotated through 180°) and recording occurs only via the right-hand side of the bubble. FIG. 9 shows the shape of a track of binary information written in this manner. Recording occurs alternately on the left-hand or on the right-hand side of the track.

The principle of a scanning device for storing data according to the invention is shown in FIG. 10. A bubble plate 33 containing a bubble 39 which is maintained by a bias field Ho which is oriented along the easy axis of magnetization of the plate comprises conductors 29 and 30 which are energized so that the bubble moves in a direction transverse to the direction of movement $v$ of the magnetizable medium 34 under the influence of a field gradient. Instead of varying the dimension of the bubble in accordance with an information signal to be recorded, it is also possible on the basis of the above description to use an auxiliary field having a direction which is parallel to the shaded information tracks 36, of which auxiliary field the amplitude varies, the variation of a signal to be recorded being followed. Under the influence of this varying auxiliary field, always a part of the wall of the "bubble" 39 varying in length cooperates in recording the information so that a track 36 is written a part of which is shown on an enlarged scale in the inset.

What is claimed is:

1. A device for the magnetic storage of information comprising a remanent magnetizable recording medium having a given coercive field strength provided on a carrier, said recording medium having a plurality of information tracks, means cooperating with said carrier to selectively influence the recording medium comprising a plate of magnetizable material having one cylindrical magnetic domain for each information track, means for producing a first magnetization field having a field strength sufficient to maintain magnetic domains in said plate and having a direction normal to the plane of the plate, said domains each having a field which influences the local state of magnetization of the recording medium, means to move the recording medium relative to and parallel to the plate, and means to produce a second magnetization field having a field strength smaller than the coercive field strength of the recording medium and having a direction normal to the direction of the first field for influencing the local state of magnetization of the recording medium.

2. A device as claimed in claim 1, wherein the direction of the second magnetization field is parallel to the direction in which the recording medium is relatively movable and the amplitude of the second magnetization field is variable in accordance with an information signal to be recorded.

3. A device as claimed in claim 1, wherein the direction of the second magnetization field is variable in accordance with an information signal to be recorded.

4. A device as claimed in claim 3, wherein the direction of the second magnetization field is normal to the direction in which the recording medium is movable and has a first sense of direction or a second sense of direction opposite to the first one in accordance with a binary information signal to be recorded.

5. A device as claimed in claim 1, including means for moving a cylindrical magnetic domain in the plate along an axis which forming an angle with the direction of movement of the medium, the direction of the second magnetization field being parallel to the relative direction of movement of the cylindrical magnetic domain relative to the recording medium, and the amplitude of the second magnetization field being variable in accordance with an information signal to be recorded.

* * * * *